United States Patent
Kishi et al.

(10) Patent No.: US 12,044,524 B2
(45) Date of Patent: Jul. 23, 2024

(54) BENDING ANGLE CALCULATION METHOD AND CALCULATION APPARATUS

(71) Applicant: Kubota Corporation, Osaka (JP)

(72) Inventors: Shozo Kishi, Amagasaki (JP); Akira Yamashita, Amagasaki (JP); Kazuma Harada, Amagasaki (JP); Tamon Iden, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 204 days.

(21) Appl. No.: 17/619,364

(22) PCT Filed: Jun. 19, 2020

(86) PCT No.: PCT/JP2020/024070
§ 371 (c)(1),
(2) Date: Dec. 15, 2021

(87) PCT Pub. No.: WO2020/262214
PCT Pub. Date: Dec. 30, 2020

(65) Prior Publication Data
US 2022/0244043 A1    Aug. 4, 2022

(30) Foreign Application Priority Data

Jun. 27, 2019  (JP) ................. 2019-119881

(51) Int. Cl.
*G01B 11/26*    (2006.01)
*G06T 7/00*    (2017.01)
(Continued)

(52) U.S. Cl.
CPC ............ *G01B 11/26* (2013.01); *G06T 7/0004* (2013.01); *G06T 7/557* (2017.01); *G06T 7/564* (2017.01);
(Continued)

(58) Field of Classification Search
CPC .. G06T 7/70; G06T 7/62; G06T 7/564; G01B 11/285; B23K 2101/10; B23K 31/125
See application file for complete search history.

(56) References Cited

U.S. PATENT DOCUMENTS

| 6,732,445 B1 | 5/2004 | Scoville |
| 2002/0029127 A1 | 3/2002 | Wakashiro |

(Continued)

FOREIGN PATENT DOCUMENTS

| CN | 103189809 A | 7/2013 |
| CN | 107076549 A | 8/2017 |

(Continued)

OTHER PUBLICATIONS

International Search Report and Written Opinion and English translations thereof dated Sep. 8, 2020.

(Continued)

*Primary Examiner* — Maurice C Smith
(74) *Attorney, Agent, or Firm* — Harness, Dickey & Pierce, P.L.C.

(57) ABSTRACT

Provided is a bending angle calculation method capable of saving a worker time and effort. The bending angle calculation method includes: an image capturing step (S1) of capturing an image of a pipe in which a first pipe and a second pipe are joined together by a joint; a derivation step (S3) of deriving, from the image, a laying direction straight line corresponding to a laying direction of the pipe; and a calculation step (S4) of calculating, as a bending angle at the joint, a crossing angle between a laying direction straight line of the first pipe and a laying direction straight line of the second pipe.

14 Claims, 21 Drawing Sheets

(51) Int. Cl.
  *G06T 7/557* (2017.01)
  *G06T 7/564* (2017.01)
  *G06T 7/62* (2017.01)
  *G06T 7/70* (2017.01)
  *G06V 10/44* (2022.01)
  *G06V 20/64* (2022.01)

(52) U.S. Cl.
  CPC ............... *G06T 7/62* (2017.01); *G06T 7/70* (2017.01); *G06V 10/457* (2022.01); *G06V 20/64* (2022.01); *G06T 2207/30136* (2013.01)

(56) References Cited

U.S. PATENT DOCUMENTS

| | | | |
|---|---|---|---|
| 2013/0204426 | A1 | 8/2013 | Tanuma et al. |
| 2016/0290540 | A1 | 10/2016 | Kishi et al. |
| 2018/0087898 | A1 | 3/2018 | Akagi et al. |
| 2020/0279084 | A1 | 9/2020 | Davis et al. |
| 2022/0244043 | A1 | 8/2022 | Kishi et al. |

FOREIGN PATENT DOCUMENTS

| | | | |
|---|---|---|---|
| CN | 109669425 | A | 4/2019 |
| JP | 9-196637 | | 7/1997 |
| JP | 10-148508 | | 6/1998 |
| JP | 10-162140 | | 6/1998 |
| JP | 11-39490 | | 2/1999 |
| JP | 11-51611 | | 2/1999 |
| JP | 2001-141419 | A | 5/2001 |
| JP | 2002-099902 | A | 4/2002 |
| JP | 2003-269939 | A | 9/2003 |
| JP | 2007-192721 | A | 8/2007 |
| JP | 49-35055 | B2 | 5/2012 |
| JP | 2014-531636 | A | 11/2014 |
| JP | 2016-4483 | A | 1/2016 |
| JP | 2017-151031 | A | 8/2017 |
| KR | 2017-0130023 | A | 11/2017 |
| KR | 2017-0135790 | A | 12/2017 |
| WO | WO-2013/033442 | A1 | 3/2013 |
| WO | WO-2015/053117 | A1 | 4/2015 |
| WO | WO-2020/262214 | A1 | 12/2020 |
| WO | WO-2021107200 | A1 * | 6/2021 |

OTHER PUBLICATIONS

Shimakura et al., "The shape measurement of piping materials using two or more stereo images", The 74th national conference lecture collected-papers (2), Artificial intelligence and cognitive science, Japan, Mar. 6, 2012, pp. 2-21-2-22.
Japanese Notice of Allowance and English translation thereof for Japanese Application No. 2019-119881 mailed Apr. 4, 2023.
Japanese Office Action and English translation thereof dated Nov. 22, 2022.
International Search Report and Written Opinion for PCT/JP2022/018670 and an English translation thereof mailed Jun. 28, 2022.
Taiwanese Office Action dated Dec. 29, 2023 for corresponding Taiwanese Patent Application No. 109121133 and its English-language translation.
Quan Hou-de et al., "Study on Measurement Algorithm of Gun Servo Systems Performance", Fire Control&Command Control, vol. 34, No. 11, Nov. 2009.
Chinese Office Action for Chinese Application No. 202080045758.0 and English translation thereof dated May 11, 2024.

* cited by examiner

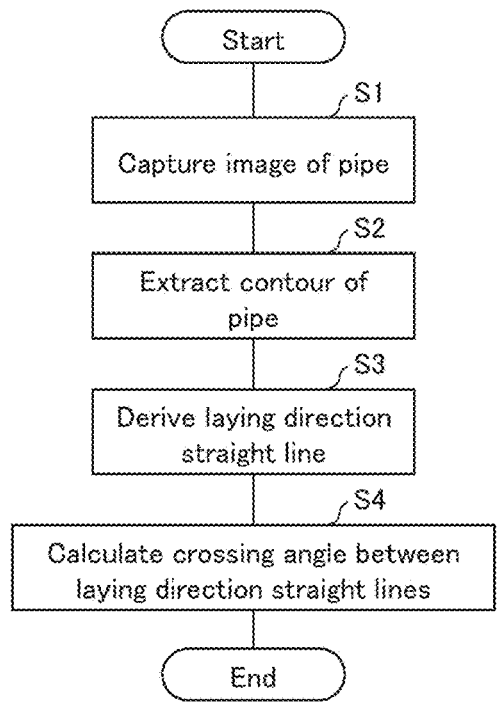
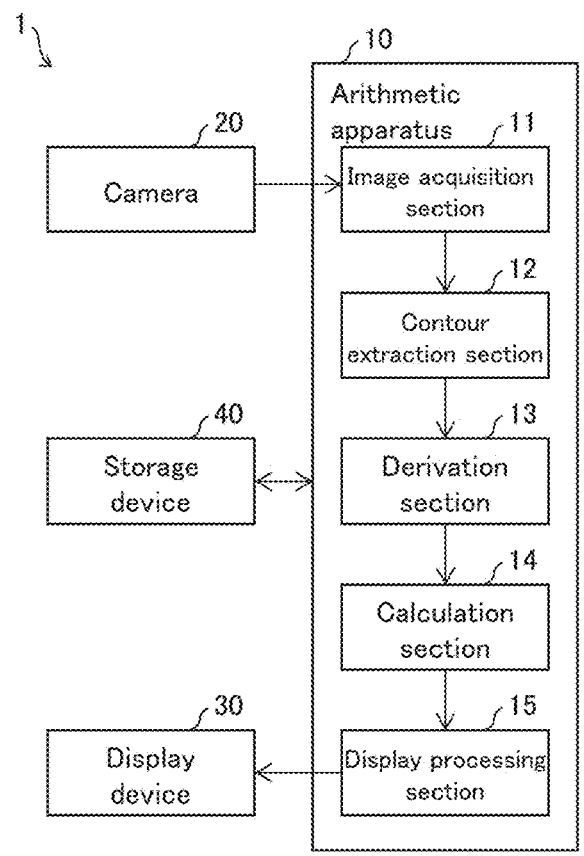

FIG. 6
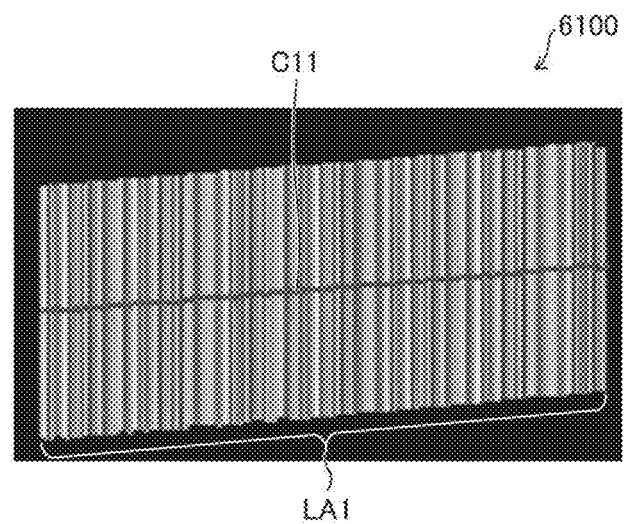
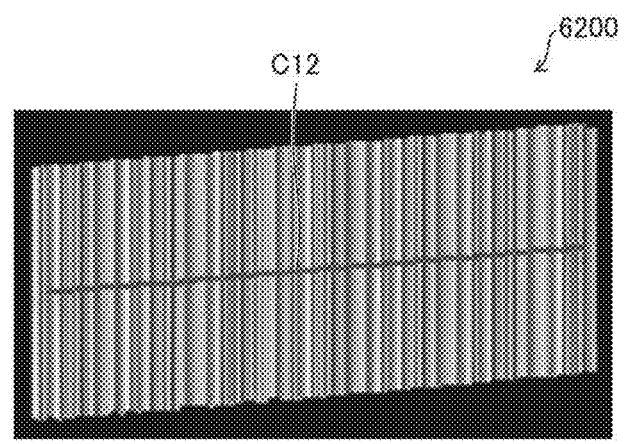

FIG. 7
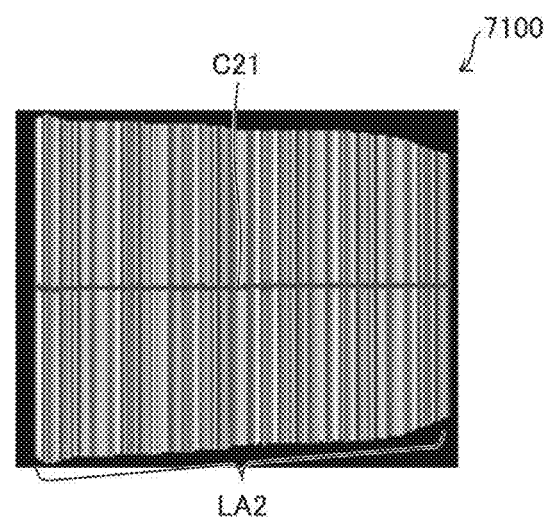
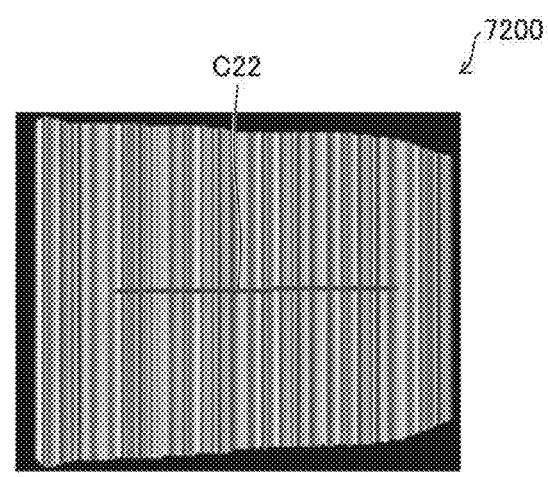

| θ0 (deg) | θ1 (deg) | θ2 (deg) | θ3+θ4 (deg) | Vertical angle | Three-dimensional angle (deg) |
|---|---|---|---|---|---|
| | ⋮ | ⋮ | ⋮ | ⋮ | ⋮ |
| a0 | a1 | a2 | a3 | a4 | 1.1 |
| | b1 | b2 | b3 | b4 | 1.2 |
| | c1 | c2 | c3 | c4 | 1.3 |
| | d1 | d2 | d3 | d4 | 1.4 |
| | e1 | e2 | e3 | e4 | 1.5 |
| | f1 | f2 | f3 | f4 | 1.6 |
| | ⋮ | ⋮ | ⋮ | ⋮ | ⋮ |
| ⋮ | ⋮ | ⋮ | ⋮ | ⋮ | ⋮ |
| b0 | a1 | a2 | a3 | a4 | 1.1 |
| | b1 | b2 | b3 | b4 | 1.2 |
| | c1 | c2 | c3 | c4 | 1.3 |
| | d1 | d2 | d3 | d4 | 1.4 |
| | e1 | e2 | e3 | e4 | 1.5 |
| | f1 | f2 | f3 | f4 | 1.6 |
| | ⋮ | ⋮ | ⋮ | ⋮ | ⋮ |
| ⋮ | | | | | |

BENDING ANGLE CALCULATION METHOD AND CALCULATION APPARATUS

TECHNICAL FIELD

The present invention relates to a calculation method and a calculation apparatus each for calculating a bending angle at a joining place where pipes are joined together.

BACKGROUND ART

At a joining place where pipes are joined together, the pipes need to be joined so that a bending angle between the pipes is within a permissible range. Examples of a bending angle calculation method include a calculation method disclosed in Non-patent Literature 1. According to the calculation method, a distance between (a) a white line drawn on a circumferential surface of one of pipes and (b) an end surface of the other of the pipes is measured at a plurality of positions in a circumferential direction of the pipes, so that a bending angle is calculated by (i) a difference between a maximum value and a minimum value of the distance and (ii) a nominal diameter of the pipes.

CITATION LIST

Non-Patent Literature

[Non-patent Literature 1]
Japan Ductile Iron Pipe Association, "*T-gata dakutairu tekkan setsugou youryousho* [T-shaped Ductile Iron Pipe Joint Procedure Specification]", p. 21-22

SUMMARY OF INVENTION

Technical Problem

However, such a conventional technique as described earlier unfortunately requires time and effort because such a conventional technique as described earlier requires a worker to measure the distance (described earlier) between the white line and the end surface a plurality of times for each joining place where the pipes are joined.

An object of an aspect of the present invention is to provide, for example, a bending angle calculation method capable of saving a worker time and effort.

Solution to Problem

In order to attain the object, a bending angle calculation method in accordance with an aspect of the present invention includes: an image capturing step of capturing an image of a pipe in which a first pipe and a second pipe are joined together by a joint; a derivation step of deriving, from the image, a laying direction straight line corresponding to a laying direction of the pipe; and a calculation step of calculating, as a bending angle at the joint, a crossing angle between a first laying direction straight line of the first pipe and a second laying direction straight line of the second pipe.

According to the configuration, in accordance with an image of a first pipe and a second pipe that are joined together by a joint, laying direction straight lines corresponding to respective laying directions of those pipes are derived, and a crossing angle between the laying direction straight lines is calculated as a bending angle. Thus, the configuration makes it possible to further save a worker time and effort as compared with a conventional calculation method.

A bending angle calculation method in accordance with an aspect of the present invention further includes: a contour extraction step of extracting respective contours of the first pipe and the second pipe in the image, wherein in the derivation step, the laying direction straight line is derived in accordance with the contours that have been extracted from the image.

According to the configuration, respective contours of the pipes are extracted from the image, and the laying direction straight line is derived in accordance with the contours. This makes it possible to suitably derive the laying direction straight line on the image.

The bending angle calculation method in accordance with an aspect of the present invention is configured such that in the derivation step, a straight line indicative of a side surface of the pipe is derived as the laying direction straight line of the pipe in accordance with a contour of the pipe.

The configuration makes it possible to calculate the bending angle in accordance with a straight line indicative of a side surface of the pipe, i.e., a straight line parallel to the laying direction of the pipe.

The bending angle calculation method in accordance with an aspect of the present invention is configured such that in the derivation step, a straight line orthogonal to a laying direction of the second pipe is derived as the second laying direction straight line of the second pipe in accordance with the contour of the second pipe.

The configuration makes it possible to calculate the bending angle in accordance with a straight line orthogonal to a laying direction of the second pipe.

The bending angle calculation method in accordance with an aspect of the present invention is configured such that in the derivation step, a center line of the pipe is derived as the laying direction straight line in accordance with a contour of the pipe.

The configuration makes it possible to calculate the bending angle in accordance with a center line of the pipe, i.e., a straight line parallel to the laying direction of the pipe.

The bending angle calculation method in accordance with an aspect of the present invention is configured such that in the derivation step, a plurality of straight lines that cross, at two points, a contour of the side surface of the pipe out of the contour of the pipe are defined, for each of the plurality of straight lines, intermediate points between the two points at which the plurality of straight lines cross the contour of the side surface of the pipe are derived, an approximate intermediate line, which is a straight line obtained by approximating a set of the intermediate points, is derived, and a straight line obtained by approximating a set of the intermediate points that are present within a predetermined distance from the approximate intermediate line is derived as the laying direction straight line.

With the configuration, an approximate intermediate line of a plurality of straight lines that cross, at two points, a contour of the side surface of the pipe, the approximate intermediate line being obtained by approximating a set of intermediate points between the two points, is derived. Furthermore, a straight line obtained by approximating a set of the intermediate points that are present within a predetermined distance from the approximate intermediate line is derived as the laying direction straight line. This makes it possible to achieve a more accurate laying direction straight line by excluding a point that is very far from the approximate intermediate line due to an influence of, for example, noise.

A bending angle calculation method in accordance with an aspect of the present invention further includes: an image generation step of generating a first component image indicative of a first component of the image and a second component image indicative of a second component of the image, wherein the contour of the first pipe and the contour of the second pipe in the first component image and the second component image, respectively, are extracted in the contour extraction step, and in the derivation step, the approximate intermediate line is derived in accordance with the contour of the pipe in each of the first component image and the second component image, and the laying direction straight line is derived in accordance with the contour of the pipe which contour is extracted from one of the first component image and the second component image in which one more intermediate points are present within a predetermined distance from the approximate intermediate line.

With the configuration, the approximate intermediate line is derived for each of the first component image and the second component image, and the laying direction straight line is derived in accordance with one of the first component image and the second component image in which one more intermediate points are present within a predetermined distance from the approximate intermediate line, i.e., the contour of the pipe which contour is extracted from one of the first component image and the second component image which one is less affected by, for example, noise. This makes it possible to achieve a more accurate laying direction straight line.

The bending angle calculation method in accordance with an aspect of the present invention is configured such that in the derivation step, a straight line indicative of the laying direction of the pipe is derived as the laying direction straight line in accordance with a prestored shape of the pipe.

With the configuration, the laying direction straight line corresponding to a pattern of the shape of the pipe can be derived in accordance with the pattern.

The bending angle calculation method in accordance with an aspect of the present invention is configured such that two straight lines that extend in a circumferential direction of the pipe and are parallel to each other are drawn on a surface of at least one of the first pipe and the second pipe, and in the derivation step, the first laying direction straight line of the first pipe or the second laying direction straight line of the second pipe is derived in accordance with a distance between the two straight lines in the image.

With the configuration, the laying direction straight line is derived in accordance with a distance in the image between two straight lines that extend in a circumferential direction of the pipe and are parallel to each other. The distance in the image between two straight lines that extend in a circumferential direction of the pipe and are parallel to each other changes for each position in the image in accordance with a relationship between an image capturing position and a laying angle. This makes it possible to calculate a three-dimensional bending angle in accordance with the image.

The bending angle calculation method in accordance with an aspect of the present invention is configured such that a light source is provided on a surface of at least one of the first pipe and the second pipe so as to have a shape that is predetermined, and in the derivation step, the first laying direction straight line of the first pipe or the second laying direction straight line of the second pipe is derived in accordance with the shape of the light source in the image.

With the configuration, the laying direction straight line is derived in accordance with a shape of a light source in the image, the light source being provided on a surface of the pipe and having a shape that is predetermined. The shape of the light source in the image, the light source being provided on the surface of the pipe and having a shape that is predetermined, changes in accordance with the relationship between the image capturing position and the laying angle. This makes it possible to calculate a three-dimensional bending angle in accordance with the image.

The bending angle calculation method in accordance with an aspect of the present invention is configured such that a straight line that extends in a circumferential direction of the pipe is drawn on a surface of at least one of the first pipe and the second pipe, and in the derivation step, the first laying direction straight line of the first pipe or the second laying direction straight line of the second pipe is derived in accordance with a shape of an ellipse, the ellipse containing the straight line in the image.

A straight line that extends in a circumferential direction of the pipe has, in an image of the pipe, a shape of a partial ellipse which shape corresponds to an angle with respect to the image capturing position. The configuration makes it possible to calculate a three-dimensional bending angle by deriving the laying direction straight line in accordance with the shape of the ellipse.

The bending angle calculation method in accordance with an aspect of the present invention is configured such that a pattern that is predetermined is shown on a surface of at least one of the first pipe and the second pipe, and in the derivation step, the first laying direction straight line of the first pipe or the second laying direction straight line of the second pipe is derived in accordance with a shape of the pattern in the image.

With the configuration, the laying direction straight line is derived in accordance with a shape of a pattern in the image which pattern is shown on a surface of the pipe and is predetermined. The shape of a pattern in the image which pattern is shown on a surface of the pipe and is predetermined changes in accordance with the relationship between the image capturing position and the laying angle. This makes it possible to calculate a three-dimensional bending angle in accordance with the image.

The bending angle calculation method in accordance with an aspect of the present invention is configured such that in the image capturing step, the image is captured in a state in which a derivation assisting tool is attached to each of the first pipe and the second pipe, and in the derivation step, the laying direction straight line is derived in accordance with an image of the derivation assisting tool.

The configuration allows the derivation section to easily derive the laying direction straight line in accordance with an image of the derivation assisting tool.

A bending angle calculation apparatus in accordance with an aspect of the present invention includes: an image acquisition section configured to acquire an image of a pipe in which a first pipe and a second pipe are joined together by a joint; a derivation section configured to derive, from the image, a laying direction straight line corresponding to a laying direction of the pipe; and a calculation section configured to calculate, as a bending angle at the joint, a crossing angle between a first laying direction straight line of the first pipe and a second laying direction straight line of the second pipe.

Advantageous Effects of Invention

An aspect of the present invention makes it possible to provide, for example, a bending angle calculation method capable of saving a worker time and effort.

BRIEF DESCRIPTION OF DRAWINGS

FIG. 1 is a flowchart showing a process carried out in a calculation system in accordance with Embodiment 1.

FIG. 2 is a block diagram illustrating a configuration of a main part of the calculation system in accordance with Embodiment 1.

FIG. 6 is a view for describing derivation of a laying direction straight line of the first pipe by a derivation section.

FIG. 7 is a view for describing derivation of a laying direction straight line of the second pipe by the derivation section.

DESCRIPTION OF EMBODIMENTS

Embodiment 1

Figure 3:
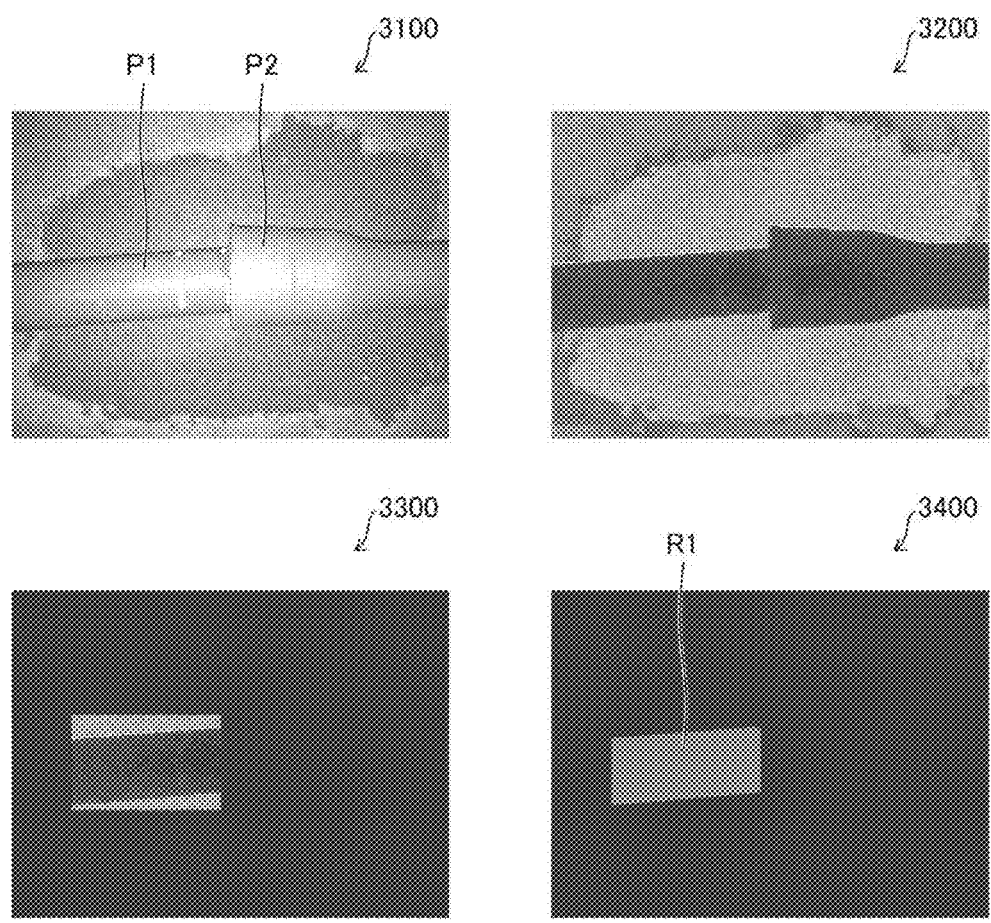
FIG. 3 is a view illustrating extraction of a contour of a first pipe by a contour extraction section.

The following description will specifically discuss an embodiment of the present invention.

FIG. 2 is a block diagram illustrating a configuration of a main part of a bending angle calculation system 1 in accordance with Embodiment 1 (hereinafter simply referred to as a "calculation system 1"). As illustrated in FIG. 2, the calculation system 1 includes an arithmetic apparatus 10 (bending angle calculation apparatus), a camera 20, a display device 30, and a storage device 40.

The arithmetic apparatus 10 carries out a process for calculating a bending angle at a joining place where pipes are joined together. The arithmetic apparatus 10 includes an image acquisition section 11, a contour extraction section 12, a derivation section 13, a calculation section 14, and a display processing section 15.

The image acquisition section 11 acquires an image of a pipe in which a first pipe P1 and a second pipe P2 (see, for example, FIG. 3) are joined together by a joint. The first pipe P1 and the second pipe P2 can be made of a material that is not particularly limited and is metal or resin. The following description assumes that a spigot of the first pipe P1 is inserted into a socket of the second pipe P2, so that the first pipe P1 and the second pipe P2 are joined together. According to Embodiment 1, the image acquisition section 11 acquires an image captured by the camera 20. The contour extraction section 12 extracts respective contours of the first pipe P1 and the second pipe P2 in the image acquired by the image acquisition section 11.

The derivation section 13 derives, from the image acquired by the image acquisition section 11, a laying direction straight line corresponding to a laying direction of the pipe. According to Embodiment 1, the derivation section 13 derives the laying direction straight line in accordance with the respective contours of the pipes, the contours having been extracted by the contour extraction section 12. A specific process carried out by the derivation section 13 will be described later. The calculation section 14 calculates, as a bending angle at the joint between the first pipe P1 and the second pipe P2, a crossing angle between a laying direction straight line of the first pipe P1 and a laying direction straight line of the second pipe P2.

Note that "the laying direction straight line corresponding to the laying direction" is not limited to a straight line parallel to the laying direction and can be, for example, a straight line orthogonal to the laying direction. In a case where the laying direction straight line of either the first pipe P1 or the second pipe P2 is the straight line orthogonal to the laying direction, an angle obtained by subtracting the crossing angle between the laying direction straight lines from $90°$ serves as the bending angle at the joint between the first pipe P1 and the second pipe P2. In a case where the laying direction straight lines of both the first pipe P1 and the second pipe P2 are each the straight line orthogonal to the laying direction, the crossing angle between the laying direction straight lines serves as the bending angle at the joint between the first pipe P1 and the second pipe P2.

The display processing section 15 causes the display device 30 to display, for example, an image indicative of a result of calculation by the calculation section 14. The display processing section 15 causes the display device 30 to display, for example, an image indicative of a bending angle at a joining place where the first pipe P1 and the second pipe P2 are joined together, the bending angle having been calculated by the calculation section 14. Furthermore, in a case where the arithmetic apparatus 10 carries out a determination process for determining whether the bending angle calculated by the calculation section 14 is within a permissible range, the display processing section 15 can carry out a process for causing the display device 30 to display an image indicative of a result of the determination process.

The camera 20 is an image capturing device for capturing an image of the joining place where the first pipe P1 and the second pipe P2 are joined together. The camera 20 can be a universal camera to be attached to, for example, a smartphone, but is not limited to the universal camera. The display device 30 is a display device for displaying an image. The storage device 40 is a storage device that stores information necessary for a process carried out in the arithmetic apparatus 10. The camera 20, the display device 30, and the storage device 40 can be respective publicly-known devices without any particular limitation.

The calculation system 1 is used to calculate a bending angle of, for example, a pipe provided in a groove. The calculation system 1 is used under, for example, the following conditions. An image of the pipe is to be captured outdoors and can be captured in either the daytime or the nighttime. A distance from a ground surface to the pipe is set to approximately not less than 60 cm and not more than 120 cm. A distance from the camera 20 to the pipe is adjusted so that a range from an end surface of the second pipe P2 to 400 mm in the transverse direction is included in the image. The pipe is gray or black and has an uneven surface. The pipe has a diameter in a range of not less than 75 mm and not more than 400 mm. Note, however, that conditions under which the calculation system 1 is used are not limited to the above conditions.

FIG. 1 is a flowchart showing a process carried out in the calculation system 1. According to the calculation system 1, first, the image acquisition section 11 captures an image of the pipe in which the first pipe P1 and the second pipe P2 are joined together by the joint (S1, an image capturing step). Next, the contour extraction section 12 extracts the respective contours of the first pipe P1 and the second pipe P2 in the image of the pipe, the image having been captured in step S1 (S2, a contour extraction step).

The derivation section 13 derives, in accordance with the contours of the pipes, the contours having been extracted in step S2, the laying direction straight line corresponding to the laying direction of the pipe (S3, a derivation step). The calculation section 14 calculates, as a bending angle at the joint, the crossing angle between the laying direction straight line of the first pipe P1 and the laying direction straight line of the second pipe P2 (S4, a calculation step).

FIG. 3 is a view illustrating extraction of the contour of the first pipe P1 by the contour extraction section 12. In FIG. 3, a reference sign 3100 indicates an example of a captured image captured by the camera 20. In a saturation image obtained by hue saturation value (HSV) transformation of the captured image, an image of the first pipe P1 and the second pipe P2 and an image of soil, which is a background, greatly differ in saturation. The contour extraction section 12 removes a high-saturation region, i.e., a region of the image of the first pipe P1 and the second pipe P2 from the saturation image so as to generate an image indicated by a reference sign 3200 in FIG. 3.

Furthermore, the contour extraction section 12 generates an image which is indicated by a reference sign 3300 in FIG. 3, in which only an image of a background at or near the first pipe P1 is left, and from which an unnecessary background has been removed. Moreover, the contour extraction section 12 generates an image which is indicated by a reference sign 3400 in FIG. 3 and in which only a region R1 of the first pipe P1 has been extracted. The contour extraction section 12 extracts a contour of the region R1 as the contour of the first pipe P1.

Figure 4:
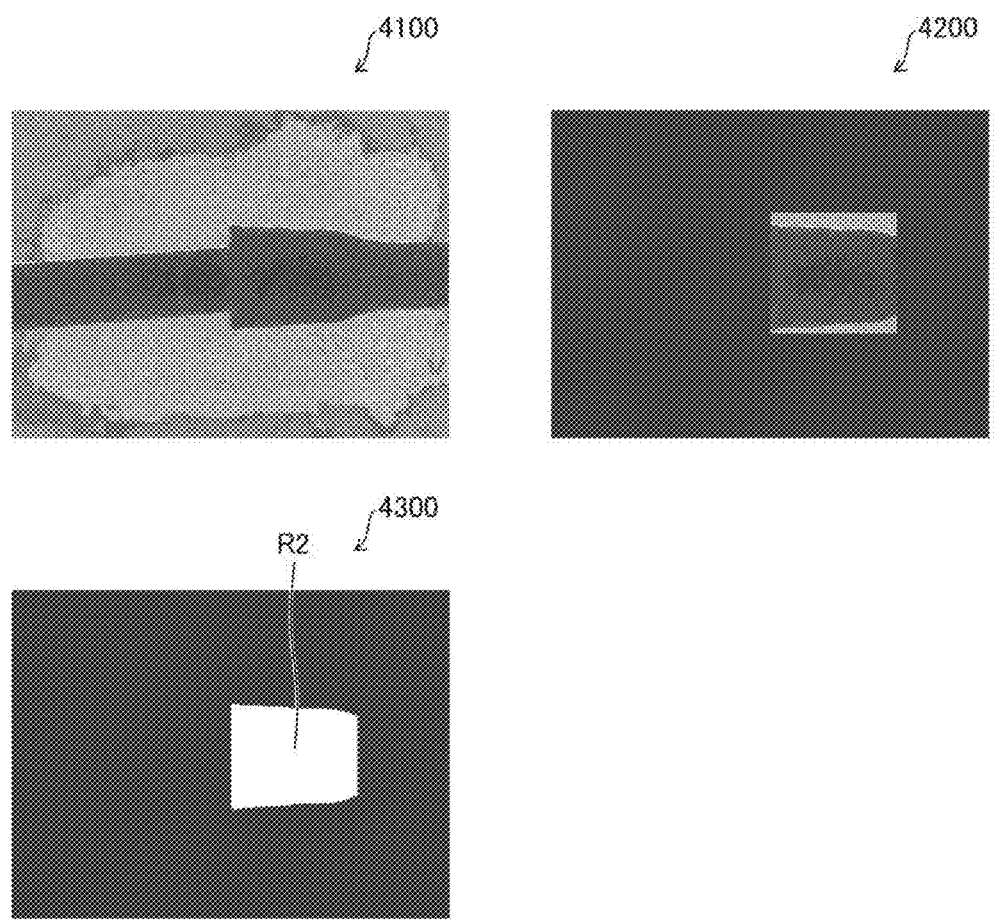
FIG. 4 is a view illustrating extraction of a contour of a second pipe by the contour extraction section.

FIG. 4 is a view illustrating extraction of the contour of the second pipe P2 by the contour extraction section 12. As in the case of the extraction of the contour of the first pipe P1, the contour extraction section 12 generates an image which is indicated by a reference sign 4100 in FIG. 4 and from which the region of the image of the first pipe P1 and the second pipe P2 has been removed from the saturation image. Subsequently, the contour extraction section 12 generates an image which is indicated by a reference sign 4200 in FIG. 4, in which only an image of a background at or near the second pipe P2 is left, and from which an unnecessary background has been removed. Moreover, the contour extraction section 12 generates an image which is indicated by a reference sign 4300 in FIG. 4 and in which only a region R2 of the second pipe P1 has been extracted. The contour extraction section 12 extracts a contour of the region R2 as the contour of the second pipe P2.

Figure 5:
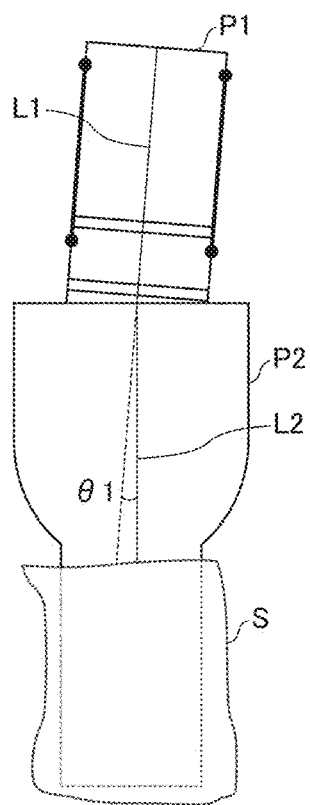
FIG. 5 is a view illustrating a first example of a bending angle calculation method in accordance with Embodiment 1.

FIG. 5 is a view illustrating a first example of a bending angle calculation method in accordance with Embodiment 1. In the example illustrated in FIG. 5, a part of the second pipe P2 which part is different from the socket is covered with a sleeve S made of polyethylene. The sleeve S is used to protect the second pipe P2. In the example illustrated in FIG. 5, the derivation section 13 derives center lines of the first pipe P1 and the second pipe P2 as respective laying direction straight lines L1 and L2 in accordance with the contours of the first pipe P1 and the second pipe P2. The calculation section 14 calculates a crossing angle θ1 between the laying direction straight lines L1 and L2 as the bending angle at the joint between the first pipe P1 and the second pipe P2.

FIG. 6 is a view for describing derivation of the laying direction straight line of the first pipe P1 by the derivation section 13. First, the derivation section 13 defines a plurality of straight lines LA1 that cross a contour of a side surface of the first pipe P1 at two points. Next, as indicated by a reference sign 6100 in FIG. 6, for each of the plurality of straight lines LA1, the derivation section 13 derives intermediate points between the two points at which the plurality of straight lines LA1 cross the contour of the side surface of the first pipe P1, and derives an approximate intermediate line C11 obtained by approximating a set of the intermediate points. Furthermore, as indicated by a reference sign 6200 in FIG. 6, the derivation section 13 derives, as the laying direction straight line L1, a straight line C12 obtained by approximating a set of the intermediate points that are present within a predetermined distance from the approximate intermediate line C11.

Moreover, the derivation section 13 can derive the laying direction straight line L1 after carrying out an approximation process with respect to a contour line of the side surface of the first pipe P1. In this case, the derivation section 13 uses a least squares method to derive an approximate straight line for a set of points forming the contour line of the first pipe P1, and carries out the least squares method again with respect to a set of points within a predetermined distance from the approximate straight line so as to carry out the approximation process with respect to the contour line. Thereafter, the derivation section 13 uses the contour line having been subjected to the approximation process to derive the laying direction straight line L1 as described earlier. This makes it possible to derive the laying direction straight line L1 with higher accuracy.

FIG. 7 is a view for describing derivation of the laying direction straight line of the second pipe P2 by the derivation section 13. First, the derivation section 13 defines a plurality of straight lines LA2 that cross a contour of a side surface of the second pipe P2 at two points. Next, as indicated by a reference sign 7100 in FIG. 7, for each of the plurality of straight lines LA2, the derivation section 13 derives intermediate points between the two points at which the plurality of straight lines LA2 cross the contour of the side surface of the second pipe P2, and derives an approximate intermediate line C21 obtained by approximating a set of the intermediate points. Furthermore, as indicated by a reference sign 7200 in FIG. 7, the derivation section 13 derives, as the laying direction straight line L2, a straight line C22 obtained by approximating a set of the intermediate points that are present within a predetermined distance from the approximate intermediate line C21.

In the example illustrated in FIG. 7, before extracting the contours of the first pipe P1 and the second pipe P2, the contour extraction section 12 can generate (i) a saturation image (first component image) indicative of saturation (a first component) of the image acquired by the second component image 11 and (ii) a lightness image (second component image) indicative of lightness (a second component) of the image acquired by the image acquisition section 11 (an image generation step). In this case, the contour extraction section 12 extracts the contours of the first pipe P1 and the second pipe P2 in each of the saturation image and the lightness image. The derivation section 13 derives the approximate intermediate lines C11 and C12 in accordance with the contours of the first pipe P1 and the second pipe P2 in each of the saturation image and the lightness image. Furthermore, the derivation section derives the laying direction straight line in accordance with the contour that is extracted from one of the saturation image and the lightness image in which one more intermediate points are present within a predetermined distance from the approximate intermediate line C11 or C12. In this case, the derivation section 13 derives the laying direction straight line in accordance with the contour of the pipe which contour is extracted from one of the saturation image and the lightness image which one is less affected by, for example, noise. This makes it possible to achieve a more accurate laying direction straight line.

In the image generation step, the contour extraction section 12 can generate, instead of either the saturation image or the lightness image, or in addition to the saturation image and the lightness image, a hue image indicative of hue of the image acquired by the image acquisition section 11. Alternatively, in the image generation step, the contour extraction section 12 can generate, instead of either the saturation image or the lightness image, or of both the saturation image and the lightness image, an image of (i) an R component, a G component, and a B component of the image acquired by the image acquisition section 11, or (ii) a component obtained by combining the R component, the G component, and the B component.

Figure 8:
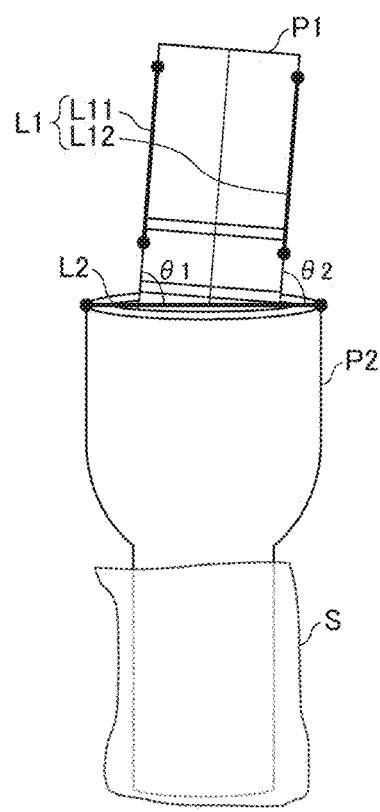
FIG. 8 is a view illustrating a second example of the bending angle calculation method in accordance with Embodiment 1.

FIG. 8 is a view illustrating a second example of the bending angle calculation method in accordance with Embodiment 1. In the example illustrated in FIG. 8, the derivation section 13 derives, as the laying direction straight line L1 of the first pipe P1, laying direction straight lines L11 and L12 each indicative of the side surface of the first pipe P1. Furthermore, in accordance with the contour P2 of the second pipe, the derivation section 13 derives, as the second laying direction straight line L2 of the second pipe P2, a straight line orthogonal to a laying direction of the second pipe P2. For example, the derivation section 13 derives, as the laying direction straight line L2 of the second pipe P2, a major axis of an ellipse represented on the end surface of the second pipe P2. The calculation section 14 calculates, as the bending angle at the joint between the first pipe P1 and the second pipe P2, one or both of (i) an angle obtained by subtracting the crossing angle θ1 between the laying direction straight lines L11 and L2 from 90° and (ii) an angle obtained by subtracting a crossing angle θ2 between the laying direction straight lines L12 and L2 from 90°.

In a case where both the crossing angles are calculated, the two crossing angles may differ from each other in magnitude due to an influence of, for example, noise. In this case, the calculation section 14 only needs to output a greater one of the crossing angles as a final bending angle in consideration of safety.

Figure 9:
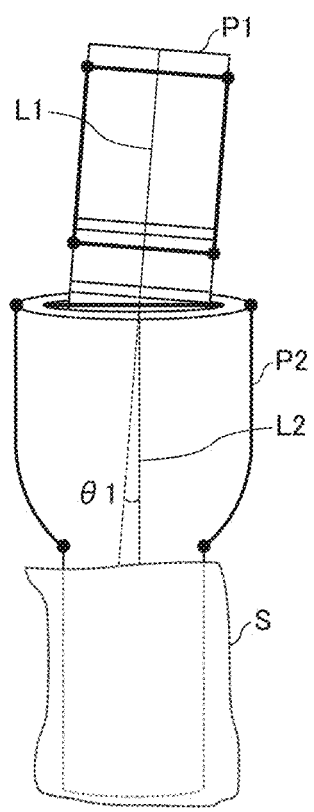
FIG. 9 is a view illustrating a third example of the bending angle calculation method in accordance with Embodiment 1.

FIG. 9 is a view illustrating a third example of the bending angle calculation method in accordance with Embodiment 1. In the example illustrated in FIG. 9, in accordance with prestored shapes of the first pipe P1 and the second pipe P2, the derivation section 13 derives, as the laying direction straight lines, straight lines indicative of the laying directions of the first pipe P1 and the second pipe P2. Specifically, in the example illustrated in FIG. 9, (i) patterns of the shapes of the first pipe P1 and the second pipe P2 and (ii) the laying directions of the pipes in the patterns are associated with each other in advance and stored in the storage device 40. The derivation section 13 matches the contours of the first pipe P1 and the second pipe P2 with the patterns so as to derive, as the laying direction straight lines L1 and L2, the straight lines indicative of the laying directions of the first pipe P1 and the second pipe P2. The calculation section 14 calculates the crossing angle θ1 between the laying direction straight lines L1 and L2 as the bending angle at the joint between the first pipe P1 and the second pipe P2.

Figure 10:
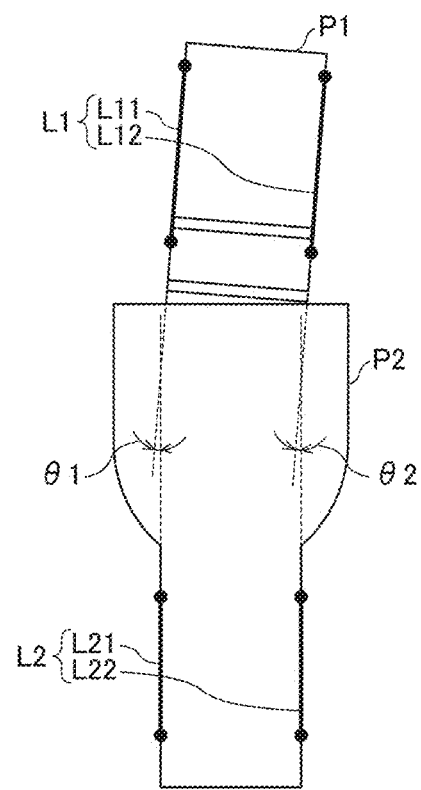
FIG. 10 is a view illustrating a fourth example of the bending angle calculation method in accordance with Embodiment 1.

FIG. 10 is a view illustrating a fourth example of the bending angle calculation method in accordance with Embodiment 1. In the example illustrated in FIG. 10, the sleeve S (see, for example, FIG. 5) of the second pipe P2 has been removed, and a cylindrical region facing away from the first pipe P1 with respect to the socket is exposed. The derivation section 13 derives, as the laying direction straight line L2 of the second pipe P2, laying direction straight lines L21 and L22 each indicative of a side surface of the region. Furthermore, the derivation section 13 derives the laying direction straight line L1 of the first pipe P1 as in the case of the example illustrated in FIG. 5. The calculation section 14 calculates, as the bending angle at the joint between the first pipe P1 and the second pipe P2, (i) a single predetermined combination of crossing angles (e.g., the crossing angle θ1 between the laying direction straight lines L11 and L21 or the crossing angle θ2 between the laying direction straight lines L12 and L22) or (ii) a plurality of combinations of crossing angles. In order to calculate the plurality of combinations of crossing angles, the calculation section 14 only needs to set the greatest one of the plurality of crossing angles as the bending angle at the joint between the first pipe P1 and the second pipe P2.

As in the case of the example illustrated in FIG. 5, the examples illustrated in FIGS. 8 to 10 also make it possible to calculate the bending angle at the joint between the first pipe P1 and the second pipe P2. The first pipe P1 and the second pipe P2 are each a straight pipe in the examples illustrated in FIGS. 5 and 8 to 10. Note, however, that the first pipe P1 and the second pipe P2 each can be, for example, a specially shaped pipe such as a T pipe or a bent pipe, or a valve.

In a case where the bending angle is calculated by the method described earlier, the image is preferably captured in the image capturing step in a state in which a derivation assisting tool is attached to each of the first pipe P1 and the second pipe P2. In this case, the derivation section 13 derives the laying direction straight line in accordance with the image of the derivation assisting tool in the derivation step. The following description will discuss an example of the derivation assisting tool.

Figure 11:
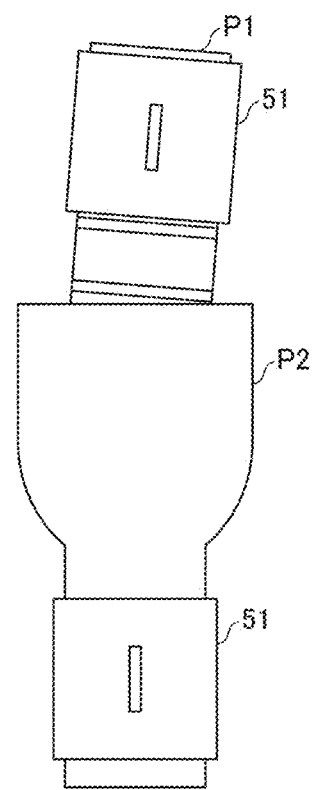
FIG. 11 is a view illustrating a state in which a derivation assisting tool is attached to each of the first pipe and the second pipe.

FIG. 11 is a view illustrating a state in which a derivation assisting tool 51 is attached to each of the first pipe P1 and the second pipe P2. The derivation assisting tool 51 has a shape obtained by cutting, along a plane passing through a central axis of each of the first pipe P1 and the second pipe P2, a tube that can be attached to the outside of each of the first pipe P1 and the second pipe P2. The derivation assisting tool 51 can be made of a material that is not particularly limited and is, for example, metal or resin. The derivation assisting tool 51 is colored in a color different from that of the first pipe P1 and the second pipe P2.

In a case where contrast between (a) the color of the first pipe P1 and the second pipe P2 and (b) a color of the background is low, the image is preferably captured in a state in which the derivation assisting tool 51 is attached to each of the first pipe P1 and the second pipe P2. In this case, since contrast between the derivation assisting tool 51 and the background becomes high, a contour of an image of the derivation assisting tool 51 can be easily extracted from the captured image. This allows the derivation section 13 to easily derive the laying direction straight line in accordance with the extracted contour.

Figure 12:
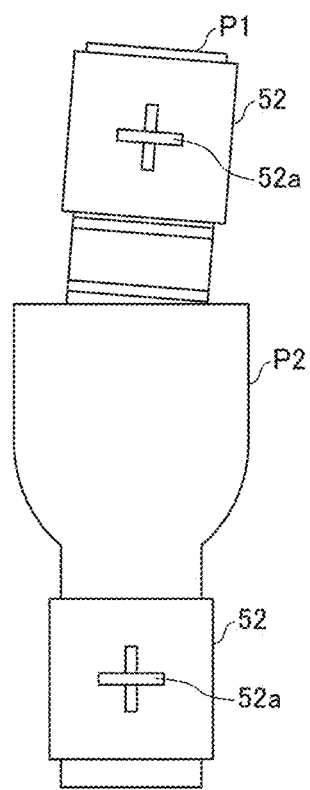
FIG. 12 is a view illustrating a state in which a derivation assisting tool is attached to each of the first pipe and the second pipe.

FIG. 12 is a view illustrating a state in which a derivation assisting tool 52 is attached to each of the first pipe P1 and the second pipe P2. The derivation assisting tool 52 has a shape of a part of a tube that can be attached to the outside of each of the first pipe P1 and the second pipe P2. Further, the derivation assisting tool 52 has a surface that is provided with a light source 52a having a shape in which (i) a line segment perpendicular to an axial direction of the pipes to each of which the derivation assisting tool 52 is attached and (ii) a line segment parallel to the axial direction cross each other. The light source 52a is, for example, a plurality of light emitting diodes (LEDs) provided so as to have the above shape.

In the image capturing step, the derivation section 13 can easily derive the laying direction straight line in accordance with the shape of the light source 52a by capturing the image in a state in which the derivation assisting tool 52 is attached to each of the first pipe P1 and the second pipe P2. Furthermore, the derivation section 13 can derive the derivation laying direction straight line in accordance with a contour of the derivation assisting tool 52 as in the case of using the derivation assisting tool 51.

Figure 13:
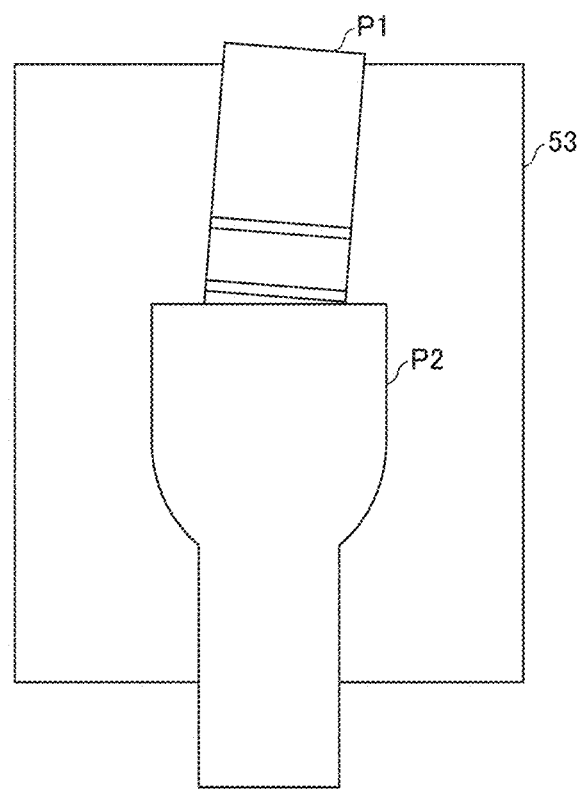
FIG. 13 is a view illustrating a state in which a derivation assisting tool is provided as a background of the first pipe and the second pipe.

FIG. 13 is a view illustrating a state in which a derivation assisting tool 53 is provided as a background of the first pipe P1 and the second pipe P2. The derivation assisting tool is not necessarily limited to that attached to each of the first pipe P1 and the second pipe P2. The derivation assisting tool 53 is, for example, paper or a flat plate colored in a color (e.g., red) different from that of the first pipe P1 and the second pipe P2, or a surface-emitting backlight. By capturing an image of the first pipe P1 and the second pipe P2 to each of which the derivation assisting tool 53 is provided, a boundary between (a) the first pipe P1 and the second pipe P2 and (b) the background in the image is made clear. This makes it easy to extract the contour and derive the laying direction straight line.

As described above, the arithmetic apparatus 10 makes it possible to calculate the bending angle at the joint between the first pipe P1 and the second pipe P2 in accordance with the image of the first pipe P1 and the second pipe P2, the image having been captured by the camera 20. This saves a worker time and effort to calculate the bending angle.

Embodiment 2

The following description will specifically discuss another embodiment of the present invention. Note that for convenience, members having functions identical to those of the respective members described in Embodiment 1 are given respective identical reference numerals, and a description of those members is omitted.

Figure 14:
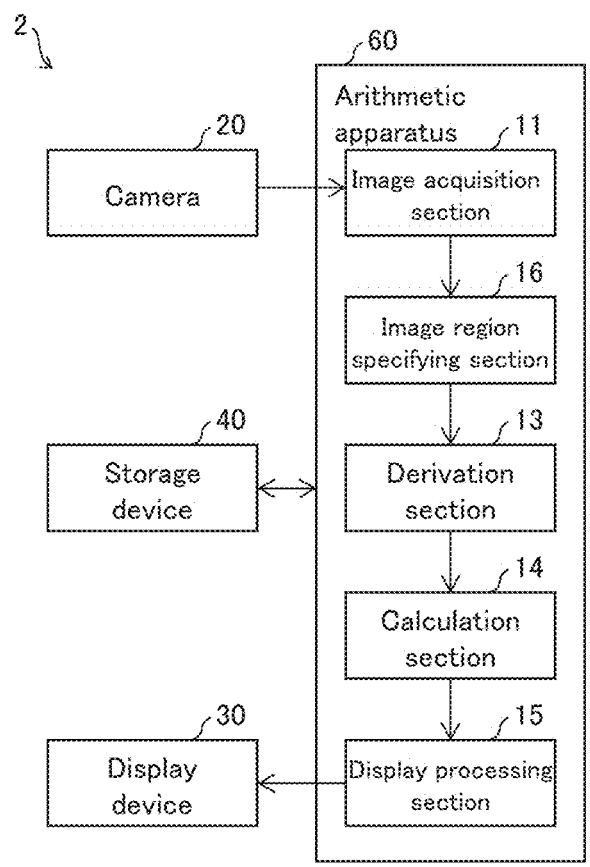
FIG. 14 is a block diagram illustrating a configuration of a main part of a calculation system in accordance with Embodiment 2.

FIG. 14 is a block diagram illustrating a configuration of a main part of a bending angle calculation system 2 in accordance with Embodiment 2 (hereinafter simply referred to as "calculation system 2"). The calculation system 2 differs from the calculation system 1 in that the calculation system 2 includes an arithmetic apparatus 60 (bending angle calculation apparatus) instead of the arithmetic apparatus 10. The arithmetic apparatus 60 differs from the arithmetic apparatus 10 in that the arithmetic apparatus 60 includes an image region specifying section 16 instead of the contour extraction section 12.

The image region specifying section 16 specifies a region on an image which region is used by a derivation section 13 to derive a laying direction straight line. The image region specifying section 16 specifies the region by, for example, matching with a pattern of a shape of a pipe, the pattern being stored in a storage device 40 in advance. The derivation section 13 derives a laying direction straight line in a three-dimensional space in accordance with the image region specified by the image region specifying section 16.

Figure 15:
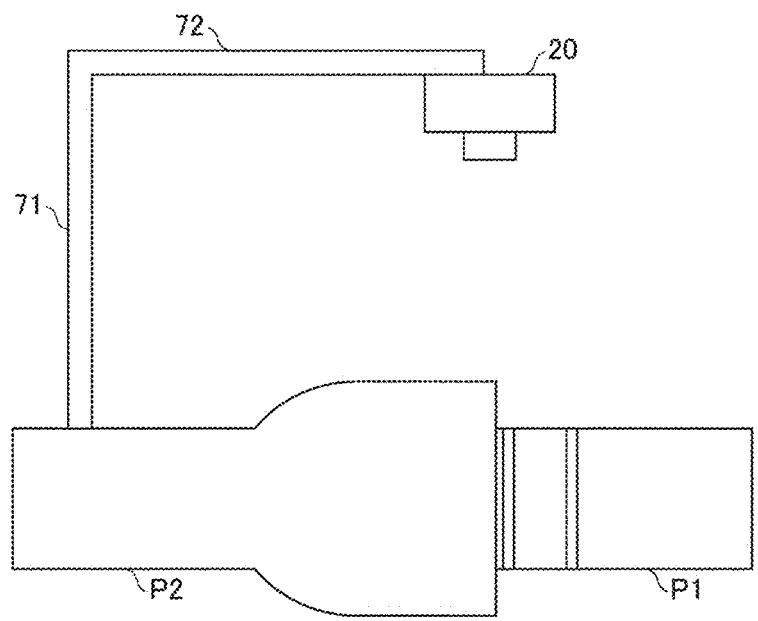
FIG. 15 is a view illustrating an example of an image capturing method carried out by a camera in Embodiment 2.

FIG. 15 is a view illustrating an example of an image capturing method carried out by a camera 20 in Embodiment 2. In the example illustrated in FIG. 15, the second pipe P2 is provided with a supporting column 71 that stands upright in a direction vertical to an axis of the second pipe P2. Furthermore, a horizontal arm 72 extends from the supporting column 71 in the direction horizontal to the axis of the second pipe P2. The camera 20 is provided in a part of the horizontal arm 72 which part faces a joint part in which a first pipe P1 and a second pipe P2 are joined together.

The camera 20 which is thus provided causes the second pipe P2 to have a laying direction straight line that is always constant with respect to the camera 20. Thus, the derivation section 13 only needs to derive a laying direction straight line of the first pipe P1. This reduces a workload of the arithmetic apparatus 60. Note that the supporting column 71 can be alternatively provided in the first pipe P1. In this case, the horizontal arm 72 extends in a direction horizontal to an axis of the first pipe P1, so that the laying direction straight line of the first pipe P1 is always constant with respect to the camera 20.

Figure 16:
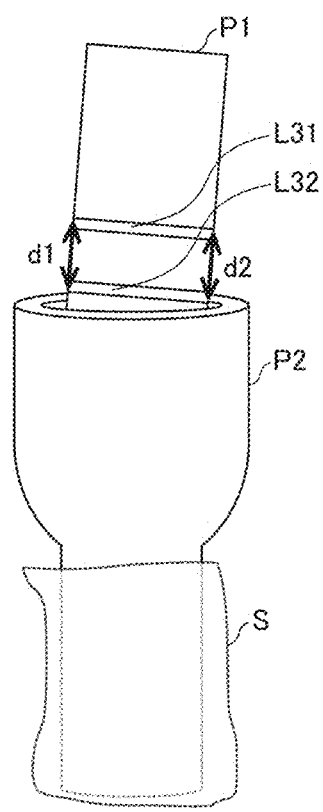
FIG. 16 is a view illustrating a first example of a bending angle calculation method in accordance with Embodiment 2.

FIG. 16 is a view illustrating a first example of a bending angle calculation method in accordance with Embodiment 2. In the example illustrated in FIG. 16, two straight lines L31 and L32 that extend in a circumferential direction and are parallel to each other are shown on the first pipe P1. The straight lines L31 and L32 can be drawn directly on the first pipe P1 with, for example, luminous paint, or can be shown by luminous tape that is linearly attached to the first pipe P1.

The image region specifying section 16 specifies a region of an image of the first pipe P1 and the second pipe which region includes an image of the straight lines L31 and L32 which image includes P2. The derivation section 13 derives the laying direction straight line of the first pipe P1 in accordance with a distance between the straight lines L31 and L32 in the image. Note, however, that the derivation section 13 derives the laying direction straight line of the second pipe P2 in a case where the straight lines L31 and L32 are shown in the second pipe P2.

Specifically, the derivation section 13 calculates the distance between the straight lines L31 and L32 at a plurality of positions. Examples of the distance at the plurality of positions include distances d1 and d2 at both ends in a width direction of the first pipe P1. A relative relationship between the distances at the plurality of positions depends on a laying direction of the first pipe P1 and a positional relationship between the camera 20 and the first pipe P1. This allows the derivation section 13 to use (i) the relative relationship between the distances between the straight lines L31 and L32 at the plurality of positions and (ii) the positional relationship between the camera 20 and the first pipe P1 to derive the laying direction straight line of the first pipe P1.

Figure 17:
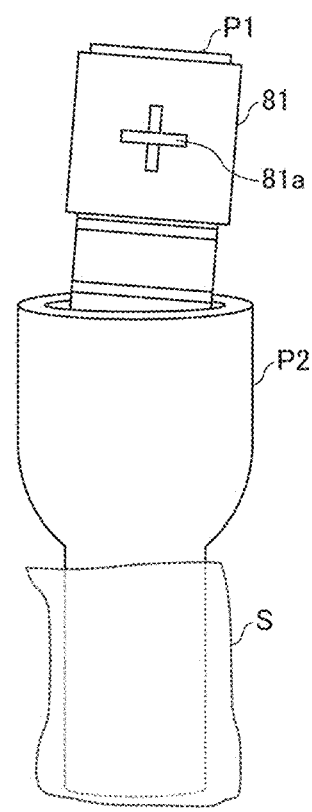
FIG. 17 is a view illustrating a second example of the bending angle calculation method in accordance with Embodiment 2.

FIG. 17 is a view illustrating a second example of the bending angle calculation method in accordance with Embodiment 2. In the example illustrated in FIG. 17, the first pipe P1 is provided with a calculation jig 81. The calculation jig 81 has a shape extending along a surface of the first pipe P1. The calculation jig 81 has a surface provided with a light source 81a having a predetermined shape. In FIG. 17, the shape of the light source 81a is two line segments orthogonal to each other, but is not limited to such line segments. The light source 81a is, for example, a plurality of LEDs provided so as to have the above shape.

The image region specifying section 16 specifies a region of the image of the first pipe P1 and the second pipe which region includes an image of the light source 81a. The derivation section 13 derives the laying direction straight line of the first pipe P1 or the laying direction straight line of the second pipe P2 in accordance with the shape of the light source 81a in the image. Note, however, that the derivation section 13 derives the laying direction straight line of the second pipe P2 in a case where the second pipe P2 is provided with the calculation jig 81.

The shape of the light source 81a in the image depends on the laying direction of the first pipe P1 and the positional relationship between the camera 20 and the first pipe P1. This allows the derivation section 13 to use (i) the shape of the light source 81a and (ii) the positional relationship between the camera 20 and the first pipe P1 to derive the laying direction straight line of the first pipe P1.

Instead of the light source 81a, a mark that has a predetermined shape and does not self-emit light can be alternatively drawn on the surface of the calculation jig 81. Note, however, that an influence of noise in the image is reduced by using the light source 81a that self-emits light.

Figure 18:
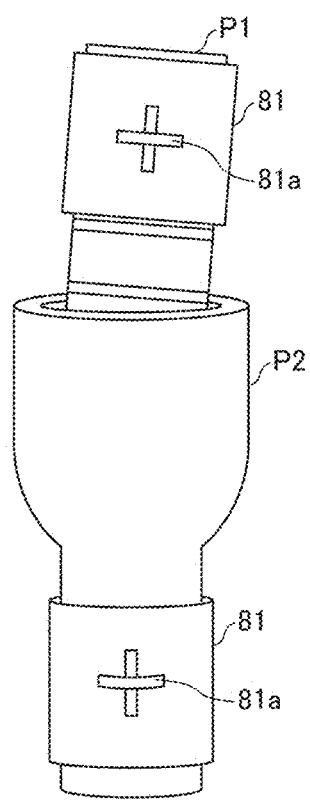
FIG. 18 is a view illustrating a variation of the second example of the bending angle calculation method in accordance with Embodiment 2.

FIG. 18 is a view illustrating a variation of the second example of the bending angle calculation method in accordance with Embodiment 2. In a case where the calculation jig 81 is used to calculate a bending angle, the camera 20 does not necessarily need to be provided as illustrated in FIG. 15. As illustrated in, for example, FIG. 18, the derivation section 13 can derive the laying direction straight line for each of the first pipe P1 and the second pipe P2 by providing not only the first pipe P1 but also the second pipe P2 with the calculation jig 81.

Figure 19:
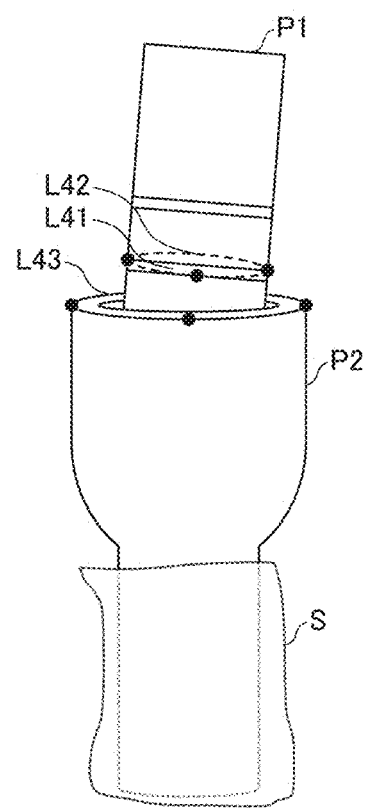
FIG. 19 is a view illustrating a third example of the bending angle calculation method in accordance with Embodiment 2.

FIG. 19 is a view illustrating a third example of the bending angle calculation method of Embodiment 2. In the example illustrated in FIG. 19, a straight line L41 that extends in the circumferential direction is shown on the first pipe P1. The straight line L41 can be shown by luminous paint or luminous tape as in the case of the straight lines L31 and L32. For simplification, an image of the straight line L41 is shown by a straight line in FIG. 19. However, in accordance with a positional relationship between the camera 20 and the straight line L41, the image of the straight line L41 in an actually captured image of the first pipe P1 is a curve, which is a part of an ellipse L42.

The image region specifying section 16 specifies a region of the image of the first pipe P1 and the second pipe which region includes the image of the straight line L41. The derivation section 13 derives the laying direction straight line of the first pipe P1 in accordance with a shape of the ellipse L42, the ellipse L42 containing the straight line L41 in the image. Note, however, that the derivation section 13 derives the laying direction straight line of the second pipe P2 in a case where the straight line L41 is shown in the second pipe P2.

The derivation section 13 specifies the ellipse L42 by three points in total, which are both ends of the image of the straight line L41 and one point between the both ends. The ellipse L42 has a minor axis having a length that depends on (i) the laying direction of the first pipe P1 in a direction perpendicular to a plane of the image and (ii) the positional relationship between the camera 20 and the first pipe P1. The ellipse L42 has a major axis having a direction that depends on (i) the laying direction of the first pipe P1 in a direction parallel to the plane of the image and (ii) the positional relationship between the camera 20 and the first pipe P1. Thus, the derivation section 13 derives, as a laying direction straight line orthogonal to the laying direction of the first pipe P1 on a plane parallel to the image, the straight line including the major axis of the ellipse L42. Furthermore, the derivation section 13 can derive, from a length ratio between the minor axis and the major axis of the ellipse L42, a laying direction straight line parallel to the laying direction of the first pipe P1 on a plane perpendicular to the image. In this case, the calculation section 14 calculates a bending angle for each of the plane parallel to the image and the plane perpendicular to the image.

In a case where the method illustrated in FIG. 19 is used, the camera 20 does not necessarily need to be provided as illustrated in FIG. 15. The camera 20 that is not provided as illustrated in FIG. 15 captures an image in a state in which luminous paint or luminous tape is attached to, for example, an end surface or an end of the second pipe P2, and the camera 20 is provided so as to be closer to the first pipe P1 than is the end surface of the second pipe P2. In this case, the image captured by the camera 20 includes the end surface or the end of the second pipe P2. In accordance with a shape of an ellipse L43 including the end surface or the end, the derivation section 13 can derive the laying direction straight line of the second pipe P2 on each of the plane parallel to the image and the plane perpendicular to the image.

Figure 20:
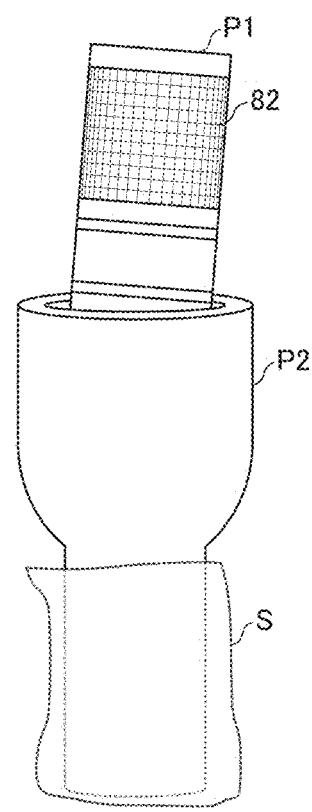
FIG. 20 is a view illustrating a fourth example of the bending angle calculation method in accordance with Embodiment 2.

FIG. 20 is a view illustrating a fourth example of the bending angle calculation method of Embodiment 2. In the example illustrated in FIG. 20, the first pipe P1 is provided with a sheet 82 on which a predetermined pattern is drawn. The sheet can be made of a material that is not particularly limited and is, for example, paper or resin. In the example illustrated in FIG. 20, the pattern drawn on the sheet 82 is a lattice pattern, but is not limited to the lattice pattern. Alternatively, the pattern can be drawn directly on the first pipe P1.

The image region specifying section 16 specifies a region of the image of the first pipe P1 and the second pipe which region includes an image of the sheet 82. The derivation section 13 derives the laying direction straight line of the first pipe P1 in accordance with a shape of the pattern in the image. Note, however, that the derivation section 13 derives the laying direction straight line of the second pipe P2 in a case where the second pipe P2 is provided with the sheet 82.

The shape of the pattern in the image, which pattern is drawn on the sheet 82, depends on the laying direction of the first pipe P1 and the positional relationship between the camera 20 and the first pipe P1. This allows the derivation section 13 to use (i) the shape of the pattern drawn on the sheet 82 and (ii) the positional relationship between the camera 20 and the first pipe P1 to derive the laying direction straight line of the first pipe P1.

Note that the sheet 82 can be obtained by drawing a three-dimensional lattice on a light-transmissive sheet. In this case, the derivation section 13 can easily derive the laying direction straight line of the first pipe P1 in accordance with a shape of the three-dimensional lattice in the image, in particular, a lattice interval in a direction perpendicular to the surface of the first pipe P1.

Figure 21:
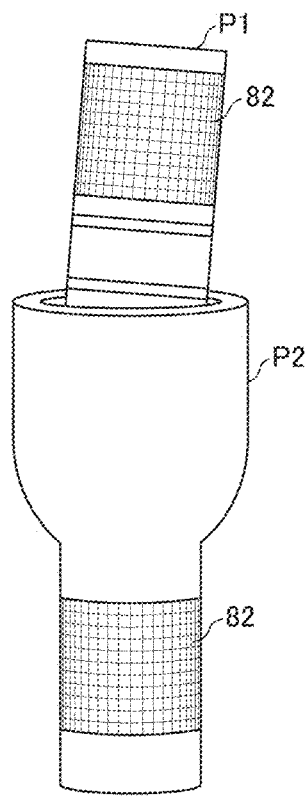
FIG. 21 is a view illustrating a variation of the fourth example of the bending angle calculation method in accordance with Embodiment 2.

FIG. 21 is a view illustrating a variation of the fourth example of the bending angle calculation method in accordance with Embodiment 2. In a case where the sheet 82 is used to calculate a bending angle, the camera 20 does not necessarily need to be provided as illustrated in FIG. 15. As illustrated in, for example, FIG. 21, the derivation section 13 can derive the laying direction straight line in the three-dimensional space for each of the first pipe P1 and the second pipe P2 by providing not only the first pipe P1 but also the second pipe P2 with the sheet 82. With the configuration, the calculation section 14 can calculate the bending angle in accordance with the respective laying direction straight lines of the first pipe P1 and the second pipe P2 even in a case where the camera 20 is not positionally fixed.

As described above, the arithmetic apparatus 60 makes it possible to three-dimensionally calculate the bending angle for the first pipe P1 and the second pipe P2. This makes it possible to further save a worker time and effort.

Embodiment 3

The following description will specifically discuss a further embodiment of the present invention. According to Embodiment 3, a calculation section 14 creates a table showing a relationship between (a) an angle calculated from an image of a first pipe P1 and a second pipe P2 and (b) an angle in a depth direction of the image (hereinafter simply referred to as a "vertical angle"), the angle being formed by the first pipe P1 and the second pipe P2, and refers to the table so as to calculate the vertical angle.

Figure 22:
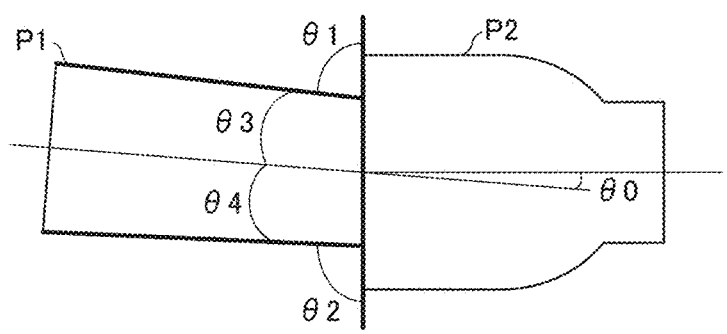
FIG. 22 is a view illustrating a state in which the first pipe bends toward a front of an image with respect to the second pipe.
Figure 23:
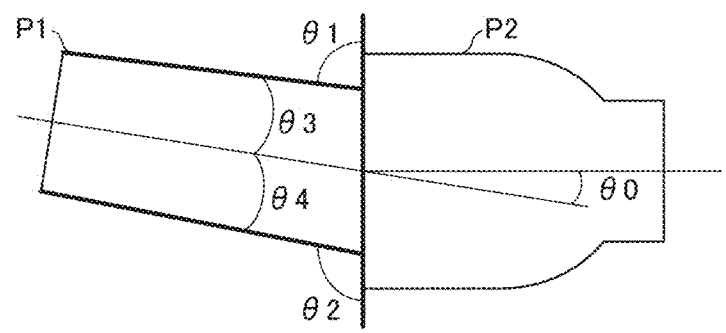
FIG. 23 is a view illustrating a state in which the first pipe bends toward a back of an image with respect to the second pipe.

FIG. 22 is a view illustrating a state in which the first pipe P1 bends toward a front of an image with respect to the second pipe P2. FIG. 23 is a view illustrating a state in which the first pipe P1 bends toward a back of an image with respect to the second pipe P2. The calculation section 14 uses the method described earlier with reference to, for example, FIG. 5 to calculate an angle $\theta 0$ formed between a center line of the first pipe P1 and a center line of the second pipe P2. Furthermore, the calculation section 14 calculates angles $\theta 1$ and $\theta 2$ ($\theta 1 \le \theta 2$) formed between respective both side surfaces of the first pipe P1 and an end surface of the second pipe P2. Moreover, the calculation section 14 calculates angles $\theta 3$ and $\theta 4$ formed between the center line of the first pipe P1 and respective contour lines of the both side surfaces of the first pipe P1. In order to create the table, the calculation section 14 calculates $\theta 1$ to $\theta 4$ for an image in which the vertical angle is changed in a plurality of ways. Then, the calculation section 14 analyzes a relationship between the vertical angle and $\theta 3+\theta 4$ for each value of $\theta 0$.

Figure 24:
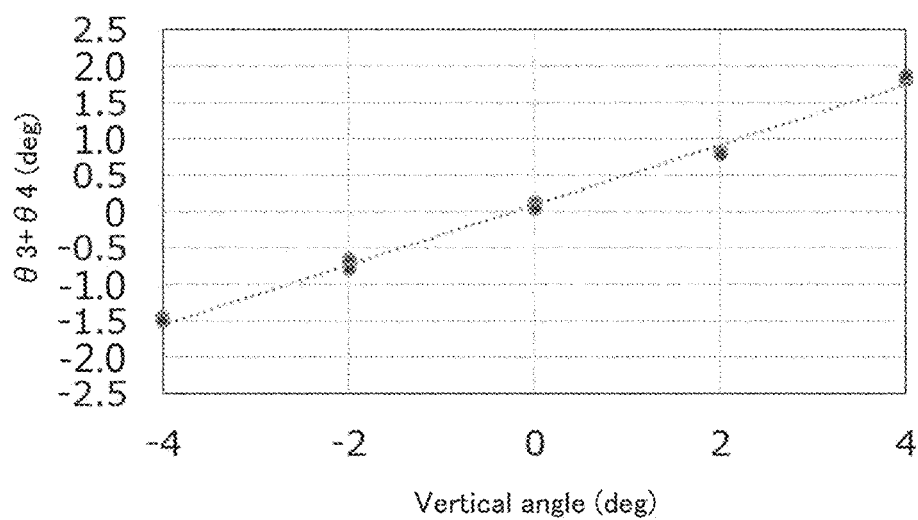
FIG. 24 is a view illustrating a result of analysis of a relationship between (a) a vertical angle and (b) $θ3$ and $θ4$ in a case where $θ0$ is $0°$.
Figures 25, 26:
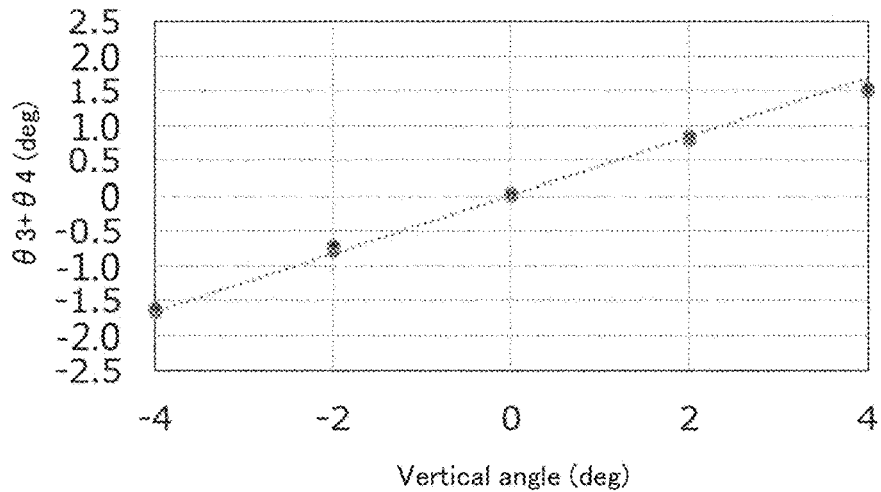
FIG. 25 is a view illustrating a result of analysis of the relationship between (a) the vertical angle and (b) $θ3$ and $θ4$ in a case where $θ0$ is $4°$.
FIG. 26 is a view illustrating a table that is created by a calculation section.

FIG. 24 is a view illustrating a result of the analysis of the relationship between the vertical angle and $\theta 3+\theta 4$ in a case where $\theta 0$ is 0°. FIG. 25 is a view illustrating a result of the analysis of the relationship between the vertical angle and $\theta 3+\theta 4$ in a case where $\theta 0$ is 4°. In FIGS. 24 and 25, the horizontal axis shows the vertical angle, and the vertical axis shows $\theta 3+\theta 4$. During the analysis, the calculation section 14 calculates a value of $\theta 3+\theta 4$ ten times for each vertical angle. In each of FIGS. 24 and 25, the value of $\theta 3+\theta 4$ in each of cases where the vertical angle is −4°, −2°, 0°, +2°, and +4° is plotted at 50 points in total.

In accordance with these points, the calculation section 14 analyzes the relationship between the vertical angle, formed between the first pipe P1 and the second pipe P2, and $\theta 3+\theta 4$. In the examples illustrated in FIGS. 24 and 25, the relationship between the vertical angle and $\theta 3+\theta 4$ is represented by the following Equations (1) and (2).

$$y=0.4124x+0.0971 \tag{1}$$

$$y=0.4189x+0.0138 \tag{2}$$

In Equations (1) and (2), x is the vertical angle, and y is $\theta 3+\theta 4$. The calculation section 14 similarly carries out the analysis also in a case where $\theta 0$ is different from 0° and 4°, and derives a relational expression similar to Equation (1) or (2).

FIG. 26 is a view illustrating a table that is created by the calculation section 14. In accordance with results of the analysis which results are shown in FIGS. 24 and 25, the calculation section 14 creates a table showing not only a relationship between values of $\theta 0$ to $\theta 4$ and the vertical angle but also a three-dimensional bending angle (three-dimensional angle) calculated from the value of $\theta 0$ and the vertical angle (see FIG. 26). Note that the analysis described earlier and the creation of the table are carried out for each diameter of the first pipe P1 and the second pipe P2.

In order to calculate, at, for example, another construction site after creating the table, a bending angle at a joint part in which pipes are jointed together, the calculation section 14 calculates $\theta 0$ to $\theta 4$ for an image of the joint part and then basically uses a relational expression corresponding to the value of $\theta 0$ and the value of $\theta 3+\theta 4$ to calculate a vertical angle. Thereafter, the calculation section 14 uses the vertical angle and $\theta 0$ to calculate a three-dimensional angle. With this method, in which it takes long to carry out a process, it is possible to calculate the three-dimensional angle with high accuracy.

Alternatively, the calculation section 14 can use another bending angle calculation method to calculate the bending angle with reference to the table shown in FIG. 26. In this case, the calculation section 14 selects, among combinations of the values of θ0 and θ3+θ4 in the table, a combination that is the closest to the values of θ0 and θ3+θ4 calculated from an image, and calculates, as the bending angle, a three-dimensional angle corresponding to the combination. In this case, it is possible to achieve a simpler process instead of reducing accuracy, as compared with the method in which the relational expression is used.

Software Implementation Example

Control blocks (in particular, the image acquisition section 11, the derivation section 13, and the calculation section 14) of each of the arithmetic apparatuses 10 and 60 can be realized by a logic circuit (hardware) provided in an integrated circuit (IC chip) or the like or can be alternatively realized by software.

In the latter case, the arithmetic apparatuses 10 and 60 each include a computer that executes instructions of a program that is software realizing the foregoing functions. The computer not only includes, for example, at least one processor but also includes a storage medium in which the program is computer-readably recorded. An object of the present invention can be achieved by the processor reading and executing, in the computer, the program stored in the storage medium. Examples of the processor include a central processing unit (CPU). Examples of the storage medium encompass "a non-transitory tangible medium" such as not only a read only memory (ROM) but also a tape, a disk, a card, a semiconductor memory, and a programmable logic circuit. The computer may further include a random access memory (RAM) or the like in which the program is loaded. The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10, 60 Arithmetic apparatus (bending angle calculation apparatus)
11 Image acquisition section
13 Derivation section
14 Calculation section

The invention claimed is:

1. A bending angle calculation method, comprising:
 an image capturing step of capturing an image of a pipe in which a first pipe and a second pipe are joined together by a joint;
 a derivation step of deriving, from the image, a laying direction straight line corresponding to a laying direction of the pipe;
 a calculation step of calculating, as a bending angle at the joint, a crossing angle between a first laying direction straight line of the first pipe and a second laying direction straight line of the second pipe, and
 a table creating step of creating a table showing a relationship between (a) an angle calculated from the image of the first pipe and the second pipe and (b) an angle in a depth direction of the image, the angle in the depth direction being formed by the first pipe and the second pipe,
 wherein, in the derivation step, the laying direction straight line is derived based on an image captured in the image capturing step, and
 wherein, in the image, capturing step, the second pipe is provided with a supporting column that stands upright in a direction vertical to an axis of the second pipe, a horizontal arm extends from the supporting column in a direction horizontal to an axis of the second pipe, a camera is provided in a part of the horizontal arm which part faces a joint part in which the first pipe and the second pipe are joined together.

2. The bending angle calculation method as set forth in claim 1, further comprising:
 a contour extraction step of extracting respective contours of the first pipe and the second pipe in the image, wherein
 in the derivation step, the laying direction straight line is derived in accordance with the contours that have been extracted from the image.

3. The bending angle calculation method as set forth in claim 2, wherein in the derivation step, a straight line indicative of a side surface of the pipe is derived as the laying direction straight line of the pipe in accordance with a contour of the pipe.

4. The bending angle calculation method as set forth in claim 2, wherein in the derivation step, a straight line orthogonal to a laying direction of the second pipe is derived as the second laying direction straight line of the second pipe in accordance with the contour of the second pipe.

5. The bending angle calculation method as set forth in claim 2, wherein in the derivation step, a center line of the pipe is derived as the laying direction straight line in accordance with a contour of the pipe.

6. The bending angle calculation method as set forth in claim 5, wherein
 in the derivation step,
  a plurality of straight lines that cross, at two points, a contour of thea side surface of the pipe out of the contour of the pipe are defined,
  for each of the plurality of straight lines, intermediate points between the two points at which the plurality of straight lines cross the contour of the side surface of the pipe are derived,
  an approximate intermediate line, which is a straight line obtained by approximating a set of the intermediate points, is derived, and
  a straight line obtained by approximating a set of the intermediate points that are present within a predetermined distance from the approximate intermediate line is derived as the laying direction straight line.

7. The bending angle calculation method as set forth in claim 6, further comprising:
 an image generation step of generating a first component image indicative of a first component of the image and a second component image indicative of a second component of the image, wherein
 the contour of the first pipe and the contour of the second pipe in the first component image and the second component image, respectively, are extracted in the contour extraction step, and in the derivation step, the approximate intermediate line is derived in accordance with the contour of the pipe in each of the first component image and the second component image, and the laying direction straight line is derived in accordance with the contour of the pipe which contour is extracted from one of the first component image and the second component image in which one more intermediate points are present within a predetermined distance from the approximate intermediate line.

8. The bending angle calculation method as set forth in claim 2, wherein in the derivation step, a straight line indicative of the laying direction of the pipe is derived as the laying direction straight line in accordance with a prestored shape of the pipe.

9. The bending angle calculation method as set forth in claim 1, wherein two straight lines that extend in a circumferential direction of the pipe and are parallel to each other are drawn on a surface of at least one of the first pipe and the second pipe, and in the derivation step, the first laying direction straight line of the first pipe or the second laying direction straight line of the second pipe is derived in accordance with a distance between the two straight lines in the image.

10. The bending angle calculation method as set forth in claim 1, wherein a light source is provided on a surface of at least one of the first pipe and the second pipe so as to have a shape that is predetermined, and in the derivation step, the first laying direction straight line of the first pipe or the second laying direction straight line of the second pipe is derived in accordance with the shape of the light source in the image.

11. The bending angle calculation method as set forth in claim 1, wherein a straight line that extends in a circumferential direction of the pipe is drawn on a surface of at least one of the first pipe and the second pipe, and in the derivation step, the first laying direction straight line of the first pipe or the second laying direction straight line of the second pipe is derived in accordance with a shape of an ellipse, the ellipse containing the straight line that extends in the circumferential reaction of the pipe in the image.

12. The bending angle calculation method as set forth in claim 1, wherein a pattern that is predetermined is shown on a surface of at least one of the first pipe and the second pipe, and in the derivation step, the first laying direction straight line of the first pipe or the second laying direction straight line of the second pipe is derived in accordance with a shape of the pattern in the image.

13. The bending angle calculation method as set forth in claim 1, wherein in the image capturing step, the image is captured in a state in which a derivation assisting tool is attached to each of the first pipe and the second pipe, and in the derivation step, the laying direction straight line is derived in accordance with an image of the derivation assisting tool.

14. A bending angle calculation apparatus comprising:

an image acquisition section configured to acquire an image of a pipe in which a first pipe and a second pipe are joined together by a joint;

a derivation section configured to derive, from the image, a laying direction straight line corresponding to a laying direction of the pipe; and a calculation section configured to calculate, as a bending angle at the joint, a crossing angle between a first laying direction straight line of the first pipe and a second laying direction straight line of the second pipe, wherein the calculation section is further configured to create a table showing a relationship between (a) an angle calculated from the image of the first pipe and the second pipe and (b) an angle in a depth direction of the image, the angle in the depth direction being formed by the first pipe and the second pipe, wherein the laying direction straight line is derived based on an image captured in the image capturing step, and wherein the second pipe is provided with a supporting column that stands upright in a direction vertical to an axis of the second pipe, a horizontal arm extends from the supporting column in a direction horizontal to an axis of the second pipe, a camera is provided in a part of the horizontal arm which part faces a joint part in which the first pipe and the second pipe are joined together.

* * * * *